No. 177.

J. E. McConnell,

Steam-Boiler Furnace,

Patented Oct. 6, 1837.

Fig. 1.

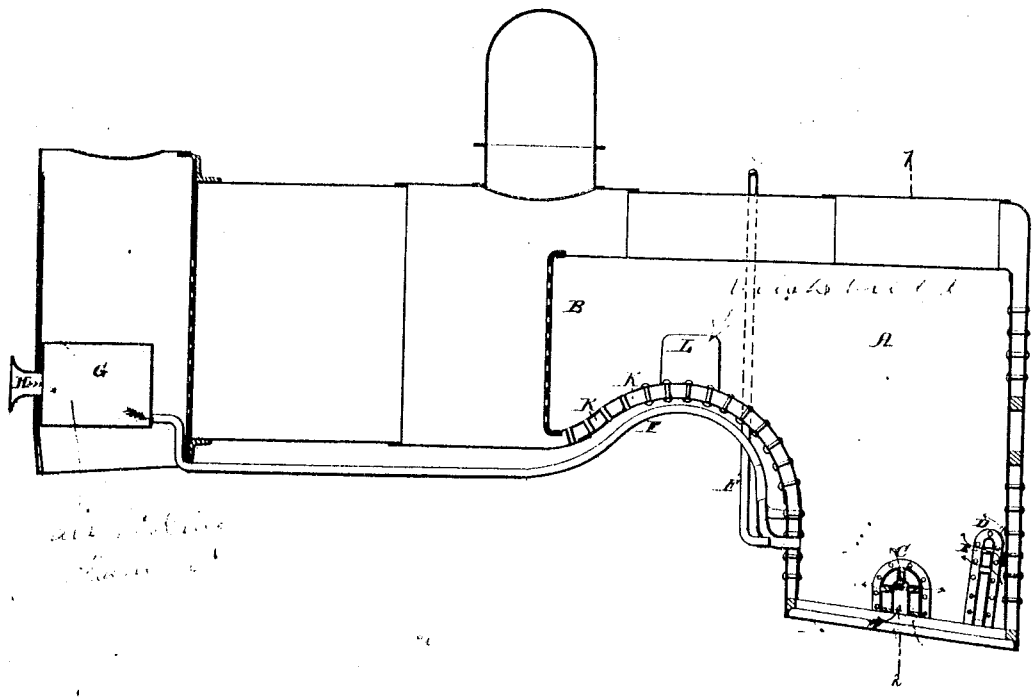

Fig. 2.

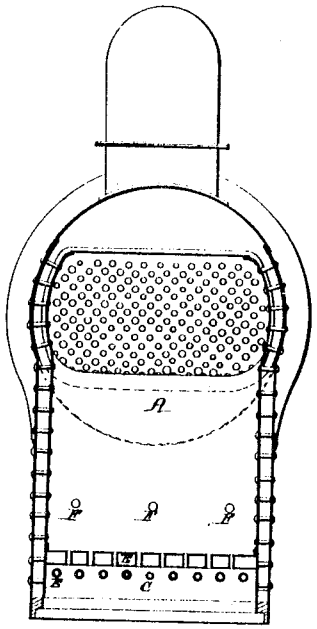

No. 177, to original Letters Patent No. 17,436.—*For Improvements in the Consumption of Smoke in Locomotive Engines.*—What I claim is, the fire-box extended into the barrel of the boiler, in combination with transverse fire-brick bridges, and with water-bridges or chambers fitted with tubular stays, through which a fresh supply of air is admitted to the combustion chamber, or extended portion of the fire-box, for the purpose of assisting the combustion, and of preventing the formation of smoke, substantially as set forth.

J. E. McConnell.

N. PETERS, PHOTO-LITHOGRAPHER, WASHINGTON, D.C.

BEST AVAILABLE COPY